(12) United States Patent  
Kuniholm et al.

(10) Patent No.: US 11,950,685 B2
(45) Date of Patent: Apr. 9, 2024

(54) PRESSURE-RELIEVING FLEXURAL LOAD BEARING STRAP AND METHOD FOR MANUFACTURING SAME

(71) Applicant: Stumpworx LLC, Portland, OR (US)

(72) Inventors: Jonathan Kuniholm, Portland, OR (US); Zachary Meyer, Portland, OR (US)

(73) Assignee: Stumpworx LLC, Portland, OR (US)

( * ) Notice: Subject to any disclaimer, the term of this patent is extended or adjusted under 35 U.S.C. 154(b) by 0 days.

(21) Appl. No.: 17/494,828

(22) Filed: Oct. 5, 2021

(65) Prior Publication Data

US 2023/0109337 A1 Apr. 6, 2023
US 2023/0329423 A9 Oct. 19, 2023

Related U.S. Application Data

(60) Provisional application No. 63/087,497, filed on Oct. 5, 2020.

(51) Int. Cl.
*B32B 38/04* (2006.01)
*A45F 3/14* (2006.01)

(52) U.S. Cl.
CPC ............... *A45F 3/14* (2013.01); *B32B 38/04* (2013.01); *A45F 2003/144* (2013.01)

(58) Field of Classification Search
CPC ....... A45F 3/14; A45F 2003/144; B32B 38/04
See application file for complete search history.

(56) References Cited

U.S. PATENT DOCUMENTS 999,484 A 8/1911 Carnes
1,173,219 A 2/1916 Rowley
(Continued)

FOREIGN PATENT DOCUMENTS

CA 2304743 A1 11/2000
CA 2325607 A1 5/2002
(Continued)

OTHER PUBLICATIONS

Alley et al., "Prosthetic Sockets Stabilized by Alternating Areas of Tissue Compression and Release," 48 JRRD. 679-96 (2010).
(Continued)

*Primary Examiner* — Cynthia L Schaller
(74) *Attorney, Agent, or Firm* — Kolitch Romano Dascenzo Gates LLC

(57) ABSTRACT

A method for forming a textile strap and the resulting textile strap includes forming a textile matrix by stacking in alternating order at least one first material layer on at least one second material layer. The at least one first material layer is bonded to the at least one second material layer in a manner to fix the at least one first material layer to the at least one second material layer. A plurality of apertures are cut into the formed textile matrix. The apertures are cut in from an edge of the textile matrix inward such that the resulting textile matrix with defined apertures is predictably flexible in each of two directions. The resulting textile matrix with defined apertures is sheathed in a formed stretch outer layer configured to substantially enclose the resulting textile matrix with defined apertures. The stretch outer layer is bonded to the textile matrix.

5 Claims, 7 Drawing Sheets

(56) References Cited

U.S. PATENT DOCUMENTS

| | | | |
|---|---|---|---|
| 1,206,753 | A | 11/1916 | Desmore |
| 1,263,675 | A | 4/1918 | Jeffery |
| 1,277,747 | A | 9/1918 | O'Connor |
| 1,285,326 | A | 11/1918 | Nelson |
| 1,507,683 | A | 9/1924 | Pecorella et al. |
| 1,989,960 | A | 2/1935 | Wheeler et al. |
| 2,409,884 | A | 10/1946 | Mollenhour |
| 2,494,646 | A | 1/1950 | Crawshaw |
| 2,668,959 | A | 2/1954 | Sargeson |
| 4,125,904 | A | 11/1978 | Levine |
| 4,258,441 | A | 3/1981 | Bell |
| 5,018,652 | A | 5/1991 | Holtzclaw, Jr. |
| 5,181,638 | A | 1/1993 | McHale |
| 5,765,735 | A | 6/1998 | Kimchi et al. |
| 5,961,019 | A | 10/1999 | Gleason et al. |
| 6,401,786 | B1* | 6/2002 | Tedeschi ............ A41F 15/00 156/251 |
| 6,793,112 | B2 | 9/2004 | Ammerman |
| 7,431,184 | B2 | 10/2008 | Gregory |
| 7,743,885 | B2 | 6/2010 | Martin et al. |
| 8,323,353 | B1 | 12/2012 | Alley et al. |
| 8,821,588 | B2 | 9/2014 | Latour |
| 8,978,224 | B2 | 3/2015 | Hurley et al. |
| 8,998,053 | B2 | 4/2015 | Cromie et al. |
| 9,044,349 | B2 | 6/2015 | Hurley et al. |
| 9,283,093 | B2 | 3/2016 | Alley |
| 9,549,828 | B2 | 1/2017 | Hurley et al. |
| D778,452 | S | 2/2017 | Cespedes et al. |
| 9,581,414 | B1 | 2/2017 | Mironski |
| 10,123,888 | B2 | 11/2018 | Alley et al. |
| 10,179,056 | B2 | 1/2019 | Hurley et al. |
| 10,278,837 | B1 | 5/2019 | Martin |
| 10,369,027 | B2 | 8/2019 | Alley |
| 10,543,112 | B2 | 1/2020 | Bache et al. |
| 2004/0185247 | A1 | 9/2004 | Fenton et al. |
| 2005/0131322 | A1 | 6/2005 | Harris, Jr. et al. |
| 2007/0007314 | A1 | 1/2007 | Lin |
| 2007/0245526 | A1 | 10/2007 | Fidrych et al. |
| 2008/0142557 | A1 | 6/2008 | Hess et al. |
| 2011/0071647 | A1 | 3/2011 | Mahon |
| 2011/0197341 | A1* | 8/2011 | Formica ............ B32B 27/34 2/209.3 |
| 2011/0208321 | A1 | 8/2011 | Doddroe et al. |
| 2012/0101597 | A1 | 4/2012 | Bache |
| 2014/0121783 | A1 | 5/2014 | Alley |
| 2015/0366678 | A1 | 12/2015 | Edwards et al. |
| 2017/0128238 | A1 | 5/2017 | Hurley et al. |
| 2017/0151072 | A1 | 6/2017 | Mahon et al. |
| 2017/0238638 | A1* | 8/2017 | Flockton ............ A41F 15/00 |
| 2017/0274167 | A1* | 9/2017 | Huddart ............ A61M 16/0875 |
| 2018/0214284 | A1 | 8/2018 | Wagner et al. |
| 2019/0091094 | A1* | 3/2019 | Romo ............ A61H 3/00 |
| 2019/0200693 | A1 | 7/2019 | Bishop |
| 2020/0163783 | A1 | 5/2020 | Martin |

FOREIGN PATENT DOCUMENTS

| | | |
|---|---|---|
| ES | 2642964 T3 | 11/2017 |
| WO | 2006138388 A2 | 12/2006 |
| WO | 2018144736 A1 | 8/2018 |

OTHER PUBLICATIONS

Mutnick, Ally, "McCormick Freshman Design Prosthetic Arms for Amputee Patients," The Daily Northwestern (Jan. 9, 2013), https://dailynorthwestern.com/2013/01/09/campus/mccormick-freshmen-design-prosthetic-arms-for-amputee-patients/.

Miguelez et al., "The Transradial Anatomically Contoured (TRAC) Interface: Design Principles and Methodology," 15 JPO. 148-57 (2003).

Paterno et al., "Sockets for Limb Prostheses: A Review of Existing Technologies and Open Challenges," 65 IEEE. 1996-2010 (Sep. 2018).

Sokolowski et al., "A Product Design Approach to Prosthetic Design: A Case Study," 3304 DMD Proc. (2019).

Taylor, Craig. L., "The Biomechanics of Control in Upper-Extremity Prostheses," 2, 3 Artificial Limbs 4-25 (1955).

Wang et al., "Physical and Mechanical Testing of Textiles," Fabric Testing, 4, 90-124 (Dec. 2008).

Wikipedia Encyclopedia, "Breathability," http.wikipedia.com/breathability, (Nov. 2, 2022).

International Society for Prosthetics and and Orthotics, 17th World Congress Abstract Book, "Prosthetics and Orthotics International" 43.1, p. 379, Kobe, Hyogo, Japan (Sep. 30, 2019).

Kuniholm, Jonathan, International Society for Prosthetics and and Orthotics, "Variable Compliance Transradial Prosthetic Socket Allowing Full Anatomical Range of Motion Using Stiff Motion Counters in a Breathable Soft Matrix" presentation, 17th World Congress, Kobe Convention Center, Kobe, Hyogo, Japan (Oct. 8, 2019).

Kuniholm et al., International Society for Prosthetics and and Orthotics, "Breathable Non-Slip Body-Powered Upper Limb Prosthetic Harness with One-handed Hardware, Designed to Eliminate Axillary Pressure and Distribute Loads" presentation, 17th World Congress, Kobe Convention Center, Kobe, Hyogo, Japan (Oct. 8, 2019).

Nash, Zachary, Pensole Footwear Design Academy,"This is Jake" presentation, IFN Platform Challenge, 10 NW 5th Avenue, Portland, Oregon 97209 (Jun. 26, 2015).

* cited by examiner

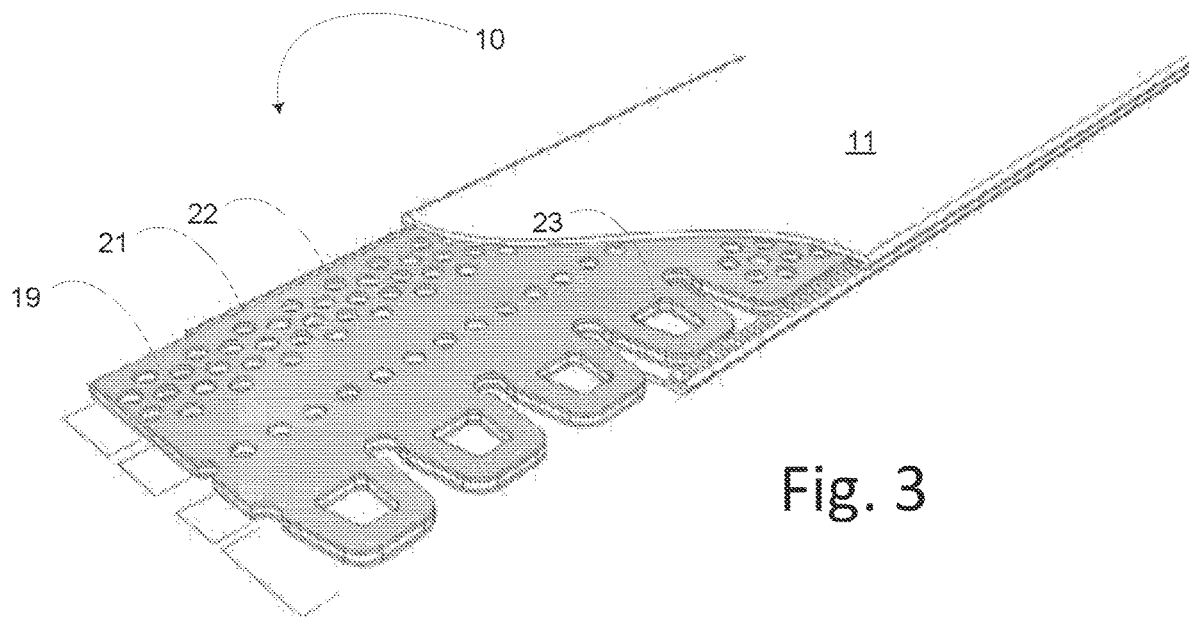
Fig. 3
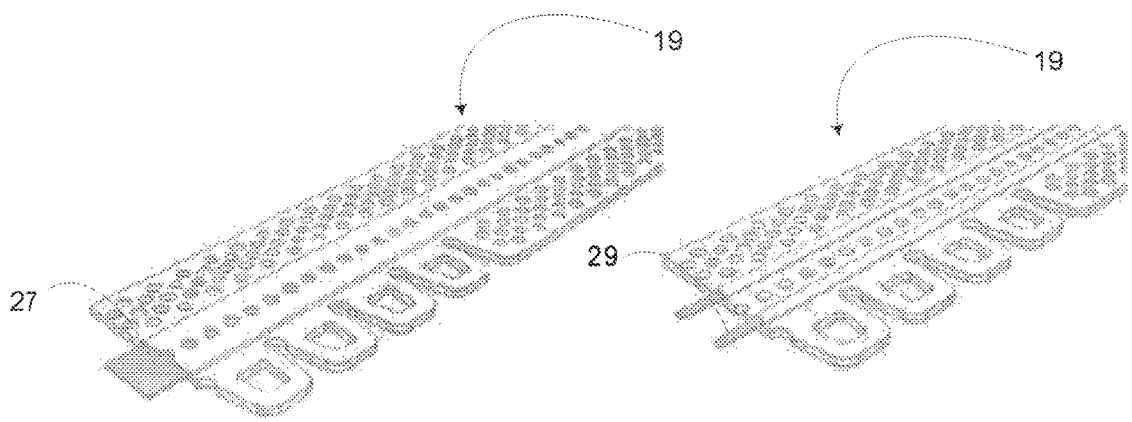
Fig. 4
Fig. 5

Fig. 11A
Fig. 11B
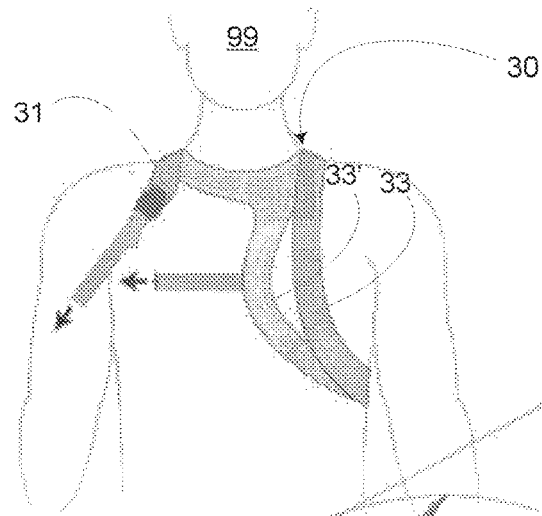
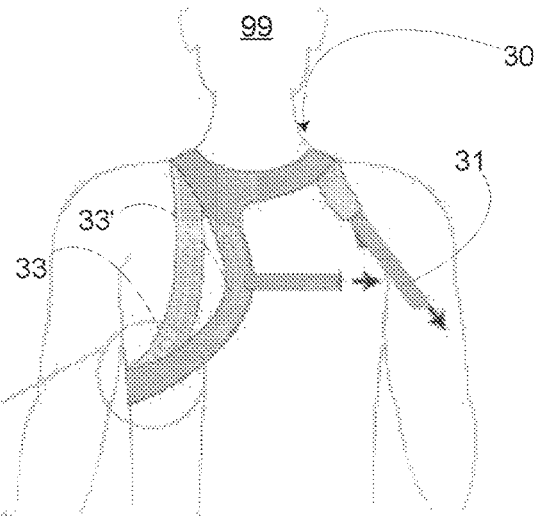
Fig. 11C
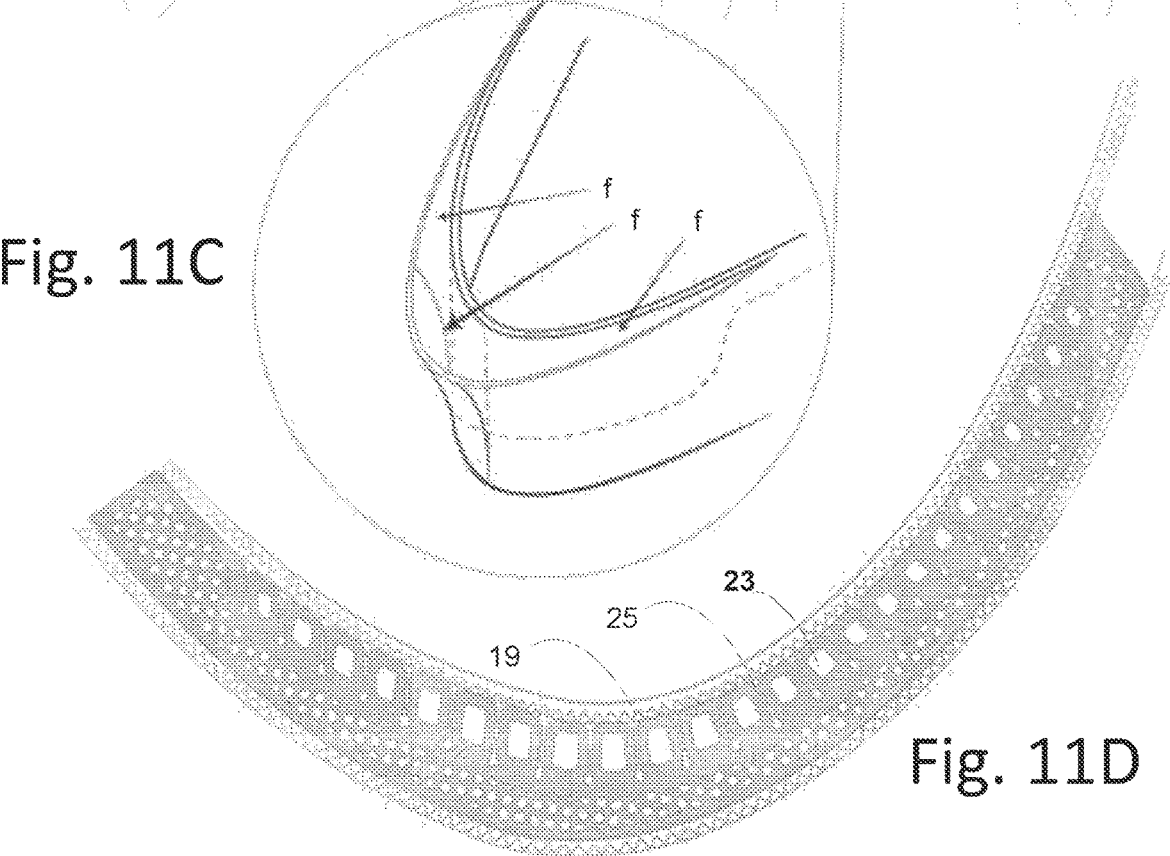
Fig. 11D

PRESSURE-RELIEVING FLEXURAL LOAD BEARING STRAP AND METHOD FOR MANUFACTURING SAME

RELATED APPLICATIONS

This application claims priority from the Provisional Patent Application No. 63/087,497 filed on Oct. 5, 2020 the entirety of which is incorporated by this reference.

FIELD OF THE INVENTION

The method for construction of and a resulting a load-bearing strap in intimate contact to a living body, and specifically relates to load bearing strap assembly component of a harnessing system.

BACKGROUND OF THE INVENTION

Human beings do not comfortably bear burdens bearing against their bodies especially those using one or more straps concentrating the weight of the burden in a narrow band over skin and muscle and driving them into contact with underlying bones. While traps conventionally designed for load bearing are generally located where the body can most comfortably bear weight. Even so, when loads are large, the interval over which a load must be borne exacerbates any effects of that burden which over time can cause the supporting tissue to become painful and fatigued, particularly at the edges of these straps where the underlying tissue transitions to supporting a load.

While wider straps distribute the load more effectively, when designed to be very wide in order maximally distribute a load, those straps can restrict motion. Thus, when using such straps, rather than enabling more natural movement, the wider strap impedes the movement of the body. Straps can also provide relief from the weight of a load with added thicknesses of padding, which also can impair movement and function when padded straps are layered under clothing or other straps.

By way of nonlimiting explanatory example, in the case of military load bearing equipment where multiple loads consisting of body armor, ammunition and equipment are hung on harnesses and backpacks which must all be supported by the shoulders and hips. In the case of such harnesses, the design and construction of these various straps, combined with the magnitude of the load itself, can greatly impact a soldier's mobility and therefore the survivability of those mobility-impaired soldiers (Marshal, Soldier's Load 1980).

Similarly, duty belts worn by police are another such example as they are tasked with holding handcuffs, batons, radios, pistols in holsters, pepper spray, notebooks, and more bulky items. These police devices are usually attached to a thick leather or synthetic belt, that fails to account for the ergonomics of the hip bones with which they are intended to interface. Existing solutions consist of plates and pads that are added to, rather than integrated with, such a belt. These pads serve to increase its bulk and mass (U.S. Pat. No. 8,998,053 B2). Traditional duty belts poorly distribute loads, and cause back and shoulder pain, numbness and sores from long hours of heavy use and movement (Arts, Masters Thesis. 2006). Police officers cite problems similar to those cited by the military in terms of the comfort of heavy loads, bulky and non-ergonomic equipment, and interference among pieces of equipment, the body, and with the external environment—vehicle seats, for example (Stubbs, CE2008. 2008).

Still another nonlimiting example is presented in safety rigging for recreational and competitive ice and rock climbing, media production, construction, cleaning or arborist work. People using such equipment sometimes spend long hours either wearing or suspended from torso or seat harnesses and can suffer fatigue and pain as a result. "Suspension trauma (also known as "harness-induced pathology" or "orthostatic shock while suspended")," possibly caused by the pressure of harness loops on blood vessels, has led to loss of consciousness or other symptoms and, in some cases, ultimately blamed for fatal accidents in mountaineering, for example (Lee, et al Emerg. Med. J. 2008).

Nearly half of all arm amputees either reject or have never worn a prosthetic arm. Most users reject the prothesis due to irritation of pain related to attachment of the prothesis to the body. Issues include poor heat and moisture management as well as harness discomfort at support sites. Users voice significant specific complaints related to the comfort of wearing an upper limb prosthesis (Biddiss and Chau, J Rehabil Res Dev 2007), and a body-powered harness is a component of the most commonly used type. Similar harnesses consisting of belts or thigh straps are used for the attachment of some lower limb prostheses. Discomfort in wearing of the harness is the most frequently cited objection to the device (Biddiss and Chau, J Rehabil Res Dev 2007). Yet it is the harness that provides both the control functionality and the superior tensile load-bearing capability of the body-powered arm. Reasons for rejecting harnessing include axillary pressure and neuropathy, bulkiness, appearance over clothing or comfort under it, and odor generated from repeated wearing (even despite cleaning). Indeed, the most common criticisms of even the most advanced prosthetic arms tend to surround the suspension of the devices rather than the devices themselves. For this reason, improvements in prosthetic harnessing stand to address a significant portion of the defects in comfort that remain obstacles to their acceptance and use by patients.

In sum, the shortcomings and risks of the straps and belts of load bearing harnesses are nearly universal in every area of application. Complaints include, beyond mere pressure on the tissues of the body but also that the edges of the straps cut and dig into the body, edges and features of items attached to the straps doing the same. It is known that thin straps are unable to properly distribute an exemplary load. Additionally, when straps lack the proper contour in two or three dimensions to properly conform to the shape of the body, the straps themselves are driven into supporting flesh. The action of straps that do not conform to the body as they are used, leads to direct pain, often in particularly uncomfortably places. Thus, these irritations of the users' body in bearing of such loads as well as any indirect pain caused by bodily compensation for improper loading, become unavoidable in the carrying of loads. Similarly, the additional pads and straps used routinely fail to breathe and to transport moisture away from any chaffing surface, accelerating irritation of the loading site on the body, thereby compounding the problems related to the wearing of the straps. What is needed in the art is a form of strap that does conform to the body and includes the ability to transport moisture from any bearing surface as against the body of the wearer.

SUMMARY OF THE INVENTION

A load bearing strap assembly component of a harnessing system, is presented to include a textile component, designed for comfortable and unobtrusive fit of an article harnessed to the body. A method for forming a textile strap and the resulting textile strap includes forming a textile matrix by stacking in alternating order at least one first material layer on at least one second material layer. The at least one first material layer is bonded to the at least one second material layer in a manner to fix the at least one first material layer to the at least one second material layer. A plurality of apertures are cut into the formed textile matrix. The apertures are cut in from an edge of the textile matrix inward such that the resulting textile matrix with defined apertures is predictably flexible in each of two directions. The resulting textile matrix with defined apertures is sheathed in a formed stretch outer layer configured to substantially enclose the resulting textile matrix with defined apertures. The stretch outer layer is bonded to the textile matrix.

The assembly includes at least one inner textile portion and at least one outer textile component, each of which features wicking qualities and has stretch in either of the lengthwise or crosswise directions or both directions. Between these two layers is at least one laminated component, bonded using heat-set sheet glues and engineered in its layering to be non-stretch, and which can also vary in its stiffness. The textile component is composed of a stack of materials that match the load prescribed by the application. A suitably formed textile component is cut or perforated to allow a gradient of stretch across a region or zone of the component. Cut apertures are arrayed along opposing edges of the textile component are defined across a lengthwise region of the strap and may vary over a crosswise distance from the edge. The cut apertures are configured to remove material such that textile material that remains relieves the textile component in a manner such that stiffness of the resulting component presents a more gradual transition from the edge of the component inward to a medial portion of the component which is not so relieved. By removing material in specific geometric patterns selected to relieve the stiffness of the component such that amount of material that the apertures relieves stiffness in making the transition from edge to medial portion proportionately to the displacement from the component edge thereby minimizing the pain created by a stiff edge of a loaded strap, particularly where width the strap is limited.

Perforation and geometry of the laminated component can selected in a manner to preserve the gradient of stretch in a zone proximate to the edge of the component and thereby to preserve the breathability and wicking of the textile components within all regions, including non-stretch zones.

The direction of the gradient of stiffness and the magnitude of stretch the textile component will facilitate in the inner and outer textile components depends on the article and location of application and may vary within a single article of application to better match the motion of the wearer in that area.

BRIEF DESCRIPTION OF THE DRAWINGS

Preferred and alternative examples of the present invention are described in detail below with reference to the following drawings:

FIG. 3 is a cut-away view of the textile strap showing the textile matrix defining cut apertures and perforations and sheathed in a stretch outer layer;

FIGS. 4 and 5 show alternate embodiments of the textile matrix defining apertures and including alternatively strap and cable tensioning members passing through the textile matrix;

FIGS. 6, 6A, 6B, 6C, and 6D show an arcuate embodiment of the textile strap;

FIGS. 11A, 11B, 11C and 11D depict the inventive textile strap as used in an embodiment of a harness for support of an arm prosthesis.

FIG. 12 is a flow chart depicting the method of constructing the inventive barrel assembly.

DETAILED DESCRIPTION OF THE PREFERRED EMBODIMENT

Figure 1:
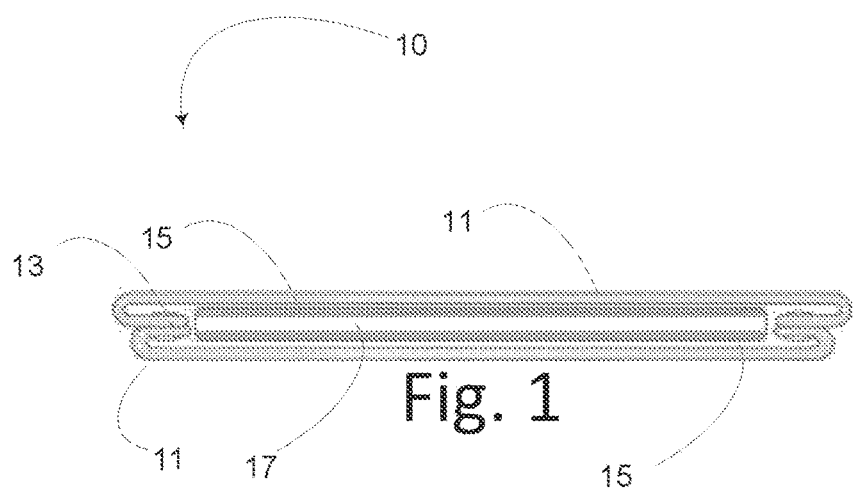
FIG. 1 is a cross-sectional view of a textile strap showing the location of a textile matrix.
Figure 2:
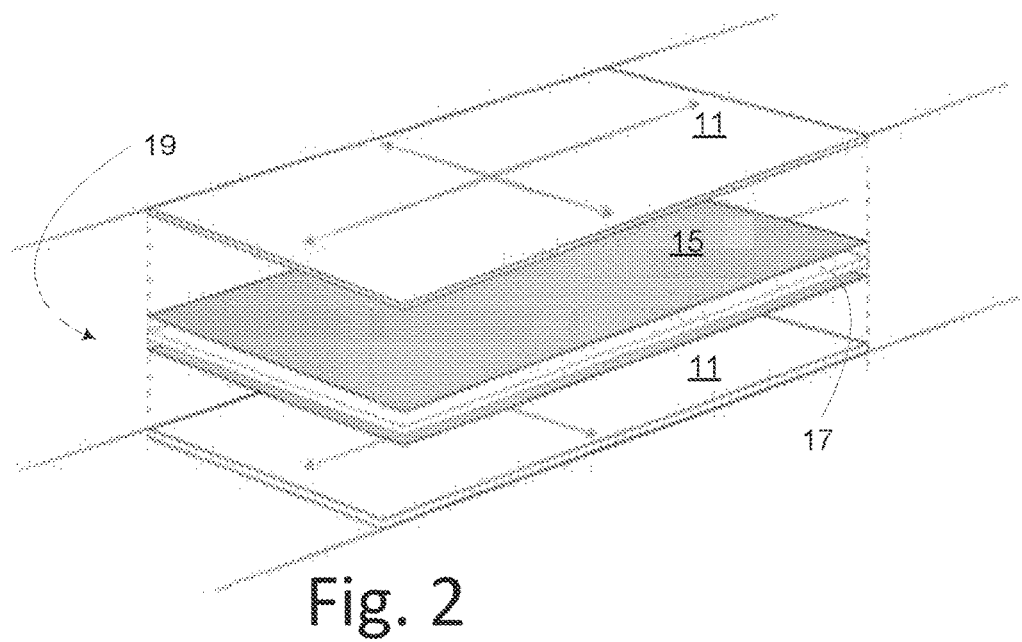
FIG. 2 is a perspective view depicting orientation of alternating first material layers and second material layers to form the textile matrix.

FIG. 1 portrays the textile strap 10 comprising a stretch outer shell 11 layer. The stretch outer shell 11 layer comprises at least one swatch having at least one axis across defining a direction for in which the stretch outer shell 11 will stretch. This can be advantageously oriented in the same direction as the underlying textile matrix 19 as depicted in FIG. 2.

Knitted fabric is a textile that results from knitting, the process of inter-looping of yarns or inter-meshing of loops. Its properties are distinct from woven fabric in that it is generally able to mechanically stretch, regardless of the stretch characteristics of the fibers with which it is constructed, while woven fabrics can generally only mechanically stretch on the bias.

The yarn in basic knitted fabrics follows a meandering path (a course), forming symmetric loops (also called bights) symmetrically above and below the mean path of the yarn. These meandering loops can be easily stretched in different directions giving knit fabrics much more elasticity than woven fabrics. Depending on the yarn and knitting pattern, knitted garments can stretch as much as 500%. In weaving, in contrast to knitted fabric, fibers are always straight, running parallel either lengthwise (warp threads) or crosswise (weft threads). For this reason, knitting is believed to have been developed for garments that must be elastic or stretch in response to the wearer's motions, such as socks and hosiery. By comparison, woven garments alternately stretch and contract mainly along one or other of a related pair of directions that lie roughly diagonally between the warp and the weft, while contracting in the other direction of the pair (stretching and contracting with the bias), and are not very elastic, unless they are woven from stretchable material such as spandex. Similarly, knit fabrics can be engineered by patterning stitches with different properties to mimic an assembly of fabrics with dramatically different properties in the same single piece.

While generally, clothing comfort is believed to be a subjective matter as it depends on the wearers' perception, stretch (often, but not always including knit) fabrics have the advantage of being more readily conformable to the body especially when encompassing a textile matrix 19 with contrasting properties. Comfort is additionally dependent on the interaction between the human body with its surrounding microclimate, and also on management of heat and moisture generated by the body, particularly during activities. In hot and humid country, it is important to maintain heat balance of the body to achieve thermo-physiological comfort state which the process is called homeostasis and, in this case, it is temperature homeostasis. In order to achieve that, the heat production by the body must be in equilibrium with the exchange of environment heat. During activities, sweating and evaporation are the key for heat loss due to the sweat carries away the heat as it evaporates away from the skin. However, any clothing, including a conventional strap can be the barrier to optimum body heat and moisture loss by impeding evaporation of sweat. The moisture and heat loss from the body and the feeling of comfort state in a certain environment affected by the clothing worn. Conventional straps also can injure the wearer where such straps contact the body, particularly under weight-bearing loads.

Knitted fabrics are widely used due to their ease in care, high degree of tactile acceptability, and the diversity of comfort-serving functions that can be achieved by the three dimensional process of knitting. Knitted fabrics also have the ability of liquid moisture transport (wicking) which, with breathability (the transport of often water vapor-bearing air away from the wearer) of the fabric, comprise two significant factors that affect the perception of comfort. It is said that thermo-physiological comfort properties of fabric are mainly influenced by fiber type, yarn parameters, fabric characteristics and finishing processes. Due to that fact, the particular characteristics of fiber and finish may be selected to optimize, for example, moisture transport properties as might be dictated by the final application selected to employ the inventive strap.

Air permeability is the rate air flowing passing perpendicularly through a known area under a prescribed air pressure between two surfaces of the material used. Air permeability has strong negative relationships with fabric weight and fabric thickness parameters. Such stands to reason understanding that permeability is achieved through porosity. However there is a negative correlation coefficient between air permeability and course/wale density ratio. Thus, as the fabric weight and fabric thickness increased, it causes the fabric volume per area to increase also to longer paths through the fabric for air to pass. These longer paths obstruct air permeability as the fabric volume per area. Recognizing porosity that plays an important role in air permeability, it too is a factor that can be chosen for a specific application. Air permeability of the knitted fabrics is mainly affected by porosity and type of fabric structures.

In general, liquid moisture transport in textile materials are mainly affected by the moisture absorbency of the fiber content and wicking ability which are determined by the capillary action, pathways and surface tension. Many researchers worked on the improvement of thermal comfort performance in clothing. Özkan et al, measured the thermal and moisture management properties of polyester knitted fabrics used in cycling clothes. The study aimed to compare to structure of the fabrics to select those that were more convenient for the cyclists. Objective fabric evaluations were conducted on thermal resistance, water vapor resistance, air permeability and moisture management properties and it is said that fabrics with good moisture comfort, low water vapor resistance and good moisture management properties were preferred. In this manner, knitted fabrics can be chose to match the application and environment in which the inventive strap will be used.

Nazir investigated the effect of changes on knitting parameters on the moisture management and air permeability of interlock fabrics. It was found that the fabric weight, the thickness of the fabric and fabric porosity increased when the machine gauge increased and the stitch length decreased. It was further concluded that loosely knitted fabric samples with higher amount of entrapped air shows good air permeability but poor moisture management properties. Conversely, tighter knitted fabrics demonstrate poorer air permeability but enhanced moisture transporting qualities.

Water vapor permeability properties is one of the crucial factors in determining clothing comfort as it represent the ability of transferring perspiration. Selection among some fabrics for highest water vapor permeability index value will also result in the highest air permeability result.

Having selected and oriented the stretch outer shell 11, the textile matrix 19 is built up from woven or nonwoven fabrics. Nonwoven fabric is a fabric-like material made from staple fiber (short) and long fibers (continuous long), bonded together by chemical, mechanical, heat or solvent treatment. The term is used in the textile manufacturing industry to denote fabrics, such as felt, which are neither woven nor knitted. Nonwoven fabrics are broadly defined as sheet or web structures bonded together by entangling fiber or filaments (and by perforating films) mechanically, thermally or chemically. They are flat or tufted porous sheets that are made directly from separate fibers, molten plastic or plastic film. They are not made by weaving or knitting and do not require converting the fibers to yarn. Typically, a certain percentage of recycled fabrics and oil-based materials are used in nonwoven fabrics. The percentage of recycled fabrics varies based upon the strength of material needed for the specific use. In addition, some nonwoven fabrics can be recycled after use, given the proper treatment and facilities. Nonwoven fabrics are engineered fabrics that may be formed to exhibit specific characteristics. Nonwoven fabrics provide specific functions such as absorbency, liquid repellence, resilience, stretch, softness, strength, flame retardancy, washability, cushioning, thermal insulation, acoustic insulation, filtration, use as a bacterial barrier and sterility. These properties are often combined to create fabrics suited for specific jobs. They can mimic the appearance, texture and strength of a woven fabric and can be as bulky as the thickest paddings.

While nonwoven materials can be used in thermal insulation, filter media, and fluid barriers—properties that are influenced by their void volume—they are used in this application primarily for their lack of stretch. Their frequent function as a fluid barrier must be overcome to the extent that their footprint in use for wearables creates negative effects with regard to heat and moisture management. This can be affected by perforating these nonwoven materials in ways that do not impact their required function.

The textile matrix 19 is a composite structure comprising at least one textile substrate of a first material 15 and one textile substrate of a second material 17 suitably bonded together to form the textile matrix 19. The matrix extends to an edge 21. The layers of textile matrix 19 may include stretch and non-stretch materials, and may include but are not limited to non-woven materials. One or more of the layers could be a membrane material, a woven material, or a plastic or metal mesh material to provide structural support.

The material layers of composite textile matrix 19 usually serve one, or a combination of, the following purposes:

Provide mechanical support for other structural or filtering layers, giving enhanced durability.

Provide two or more layers of different permeability and moisture transport efficiency.

Facilitating the combination of varied separation functions or technologies into a single textile matrix 19.

The outer layers serve as a containment to inhibit medium migration, dusting, and particle fallout from the inner layers.

In many situations, where used, the composite nonwovens might fulfill multiple objectives. For example, spunbond nonwoven can act as support layers for textile matrix 19 (such as activated carbon, meltblown and nanofiber webs, microfiber glass and cellulose) as well as protection layer.

In many cases, the role of a component in a composite serving as the second material layer 17 is to provide mechanical support and durability of the first material layer 15. For illustration, although filtration capability by electrospun nanofibers and meltblown nonwovens might be selected as the first layer 15 for comfort as air permeability is very high, while they tend to be weak and are generally too thin to provide significant mechanical support. The mechanical strength of nanofibrous layer/meltblown nonwovens are not sufficient to withstand tensile stresses placed upon materials. Stronger materials are therefore required for the second material layer 17, and materials which have been demonstrated to offer suitable mechanical strength include woven fabric, spunbond, spunlace (hydroentanged), needlepunch felt, or cellulose web.

Most often the combination of structure is made by heat bonding; the bonding process either by purely heating the process or by using hot melt adhesive. Combination is also possible by ultrasonic welding. Hydro-entanglement and needlepunching are also interesting options for the joining together of two layers to produce the textile matrix 19.

Composites with nanofiber layers are especially attractive as first layer materials 15. These same composites find applications in many critical areas such as medical, hygiene, bioseparation, etc. Where odor due to harboring moisture is a concern, an electrospun membrane will conveniently reject microparticles and bacteria preventing bacterial infestation of the textile matrix 19.

Referring again to FIGS. 1 and 2, the orientation of the textile matrix 19 is generally selected to demonstrate tensile strength along a major axis. Importantly, to allow greater flexibility of the resulting textile matrix 19, the first material is selected specifically to stretch along the major axis so that on flexure, the first material layer 15 can stretch and contract while the weight of the supported burden is borne mechanically by the second material layer 17. The stretch outer shell 11, then is oriented accordingly and opposite layers of the stretch outer shell 11 are bonded together at a joint 13 to form and encompassing tube around the textile matrix 19.

Further compliance of the textile strap 19 is introduced by perforations 22 and apertures 23 cut into the textile matrix 19 before encompassing the matrix 19 with the stretch outer shell 11. FIG. 3 shows the suitably perforated and apertured textile matrix 19 fitting into the stretch outer shell 11. Perforations of the textile matrix 22 enhance the breathability of the resulting textile matrix 19. Apertures 23 enhance flexibility of material to ensure its compliance and maximal dispersion of the weight across supporting tissue in use. Enhanced flexibility is a natural result of removal of material in a systematic pattern. Apart from punch press, rotary pinned, and die cutting, there are several additional methods to remove such material. CNC cutting, Waterjet cutting and Laser cutting can be used. These cutting methods are chosen based upon specific goals such as pattern uniformity, lack of edge imperfections and loose fibers, no delamination or distortion, and no lost or missing features. Non-homogeneous materials such as those of the first material layer 15 and the second material layer 17 used to build up the textile matrix 19 must be selected judiciously as poor chose, choices can result in a thermal mismatch and delamination between layers. Often these methods require a secondary process to remove burrs and loose fibers.

Simply stated, perforating is the process of making holes in material, usually metal, using a mechanical means to penetrate, or "punch" through the material, leaving behind a hole of particular size and shape. Various factors affect cost and can even affect the feasibility of perforating as an economical means of manufacturing the textile matrix 19.

As stated above, perforations 22 are cut to assure breathability without significantly altering the mechanical support lent by the second material 17. The most common, generally strongest, and most economical round hole pattern is the 60-degree stagger. Straight and diagonal (45-degree) patterns are less common, but available in many common hole sizes. Square and slot perforations are straight, side stagger and end stagger configurations. Each configuration is suitable for breathability and moisture transport.

As to the apertures 23, the presently preferred embodiment employs rotary cutting technologies for the form cutting of textile matrix 19. Using state of the art CNC-technique almost any imaginable cutting contour can be achieved. Where smaller quantities are required, these, in the preferred embodiment, are mostly die cut with monobloc cutting cylinders, made of tool steel or by the use of magnetic cylinders/flexible dies. Larger quantities are preferably die cut with segmented tools. High alloy steel, powder metallurgical steels or tungsten carbide are primarily used as cutting segment materials. Die cutting segments can be exchanged easily when damaged. All die cutting materials serve as well as counter cutting materials. Half cuts might also be used to perforate or die cut to some extent the thickness of the processed material. Some of the materials are very thin, others made of several layers partly containing barrier functions.

In one alternative embodiment, the textile matrix is scissor cut. During the scissor cut the upper knife is pressed with a spring against the edge of the lower knife. Due to the shearing process a smooth cutting edge is created. This knife system is well-known in the art and mainly used to convert paper, foil, laminates and cartons in continuous forms and label printing machines, high performance slitters as well as special converting systems with high performance cutting systems. It is equally suitable for cutting apertures 23, based upon first material layer 15 and second material layer 17 selections. Very closely related is the pressure cut. During the pressure cut the cutting knife is pressed against a counter surface (anvil cylinder). Compared to the scissor cut, the pressure cut displaces the material. Nonetheless, in some specific applications, the displacement actually enhances the resulting textile matrix 19 by providing materials that function as splines within the textile matrix 19.

As is illustrated in FIGS. 4 and 5, the mechanical properties of the textile matrix 19 can be augmented by the inclusion, as in FIG. 4, of a mechanical strap 27 or as in FIG. 5 by the inclusion of metallic or plastic cables 29.

Figure 6:
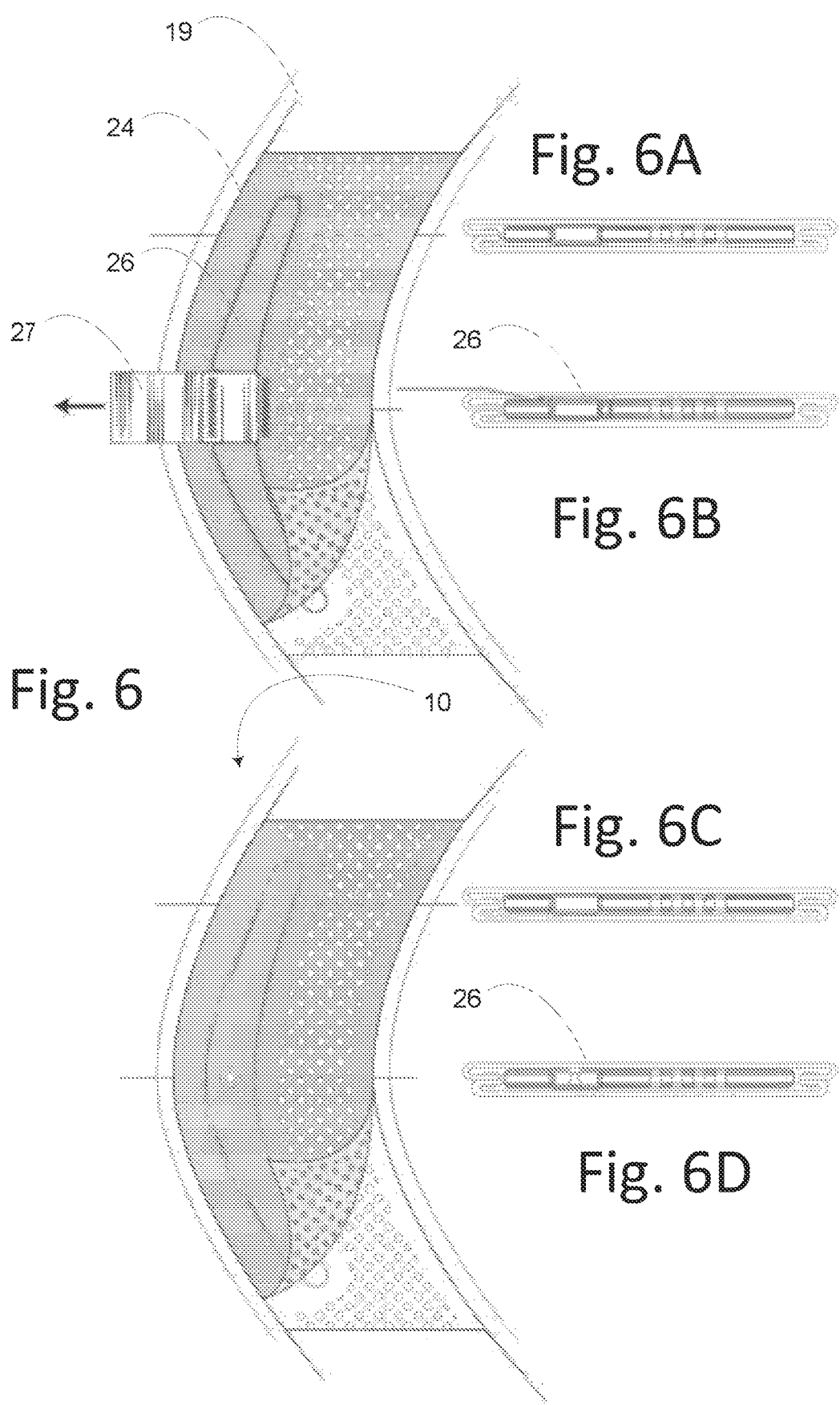

While thus far in the discussion the form of the textile strap 10 has been illustrated as a single straight band, nothing so limits this disclosure. As shown in FIG. 6, the structure can be formed as an arcuate sector to embrace a user's shoulder. In an alternate embodiment as shown in FIG. 6, the textile matrix 19 may be interrupted by the inclusion of specific edge padding 24 or, where a specific rigidity is appropriate to enhance the structure of the textile strap 10, the matrix may be interrupted to include a stiffener plate 26 for a load bearing strap attachment (e.g., for mechanical strap 27) as shown in each of FIGS. 6A, 6B, 6C and 6D.

Figure 7:
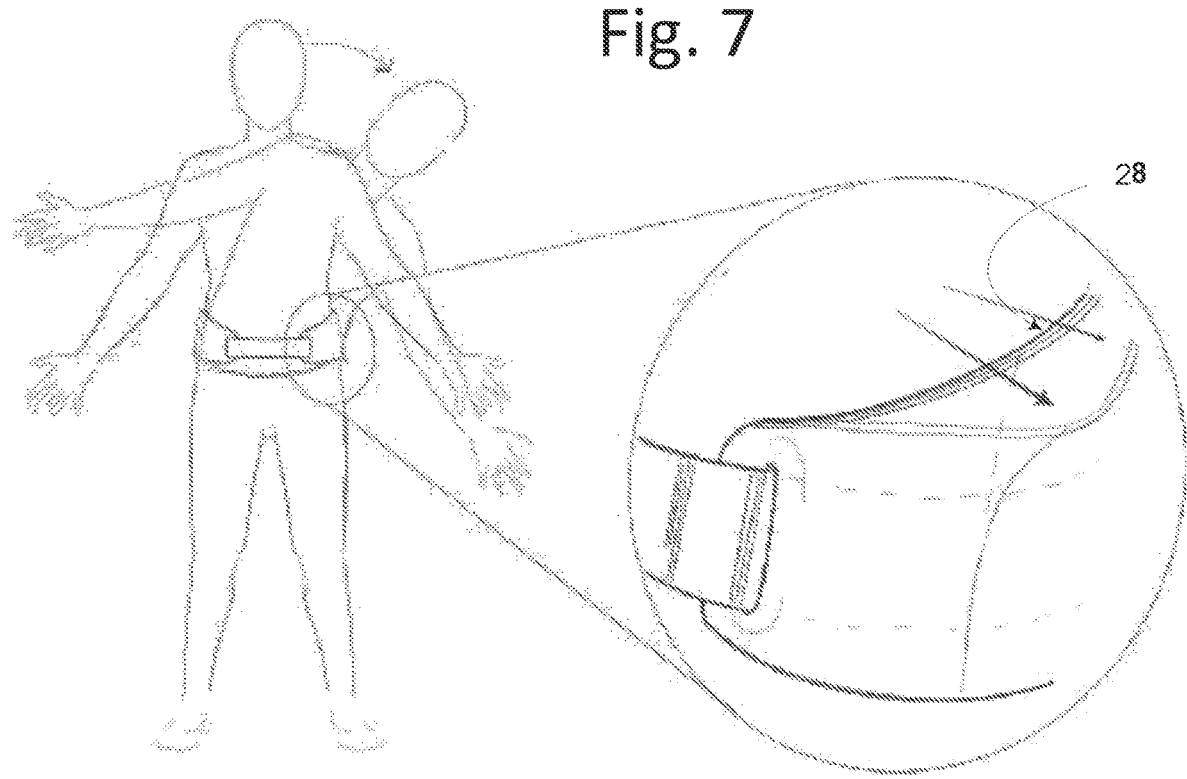
FIG. 7 depicts a flexible belt made of the textile strap
Figure 8:
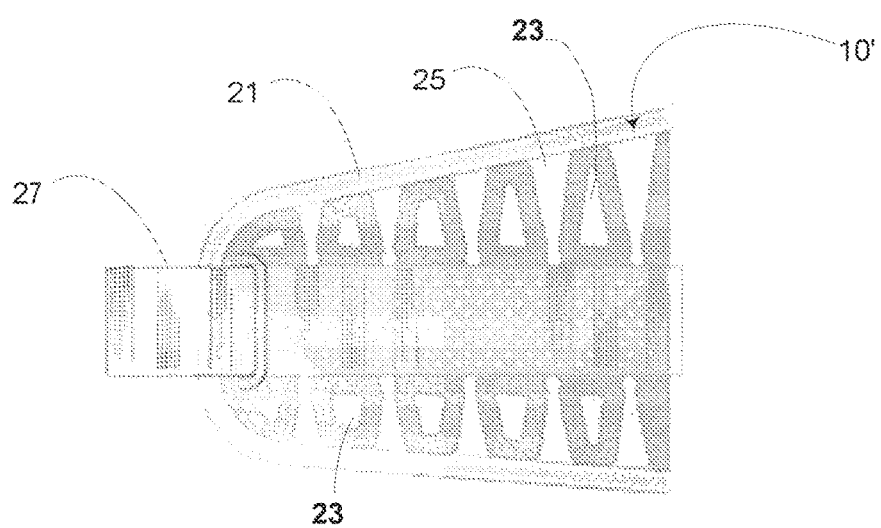
FIG. 8 depicts an alternate embodiment of the stap.

It is also not necessary to have the textile matrix 19 extend uniformly to the edge of any designed textile strap 10. In the instance of a belt application such as shown in FIG. 7, at the hips, it may be advantageous to stagger layer of the second layer material 17 to create a variable compliance of the belt as the belt surrounds the hips at the crown of the hip, indicated at 28. In this fashion, the belt presents a softer interface to allow the movement of the crown of the hip beneath the matrix 19. As can be seen in FIG. 8, gaps 25 are the sites of removed material between fingers defined by textile matrix 19. While tensile strength and tension can be applied to the interior mechanical strap 27 as depicted in FIG. 4, the pattern of gaps 25 is chosen to remove more material in the proximity to the edge 21, where the proportion of material removed decreases as a function of distance from the edge 21.

Figure 9A:
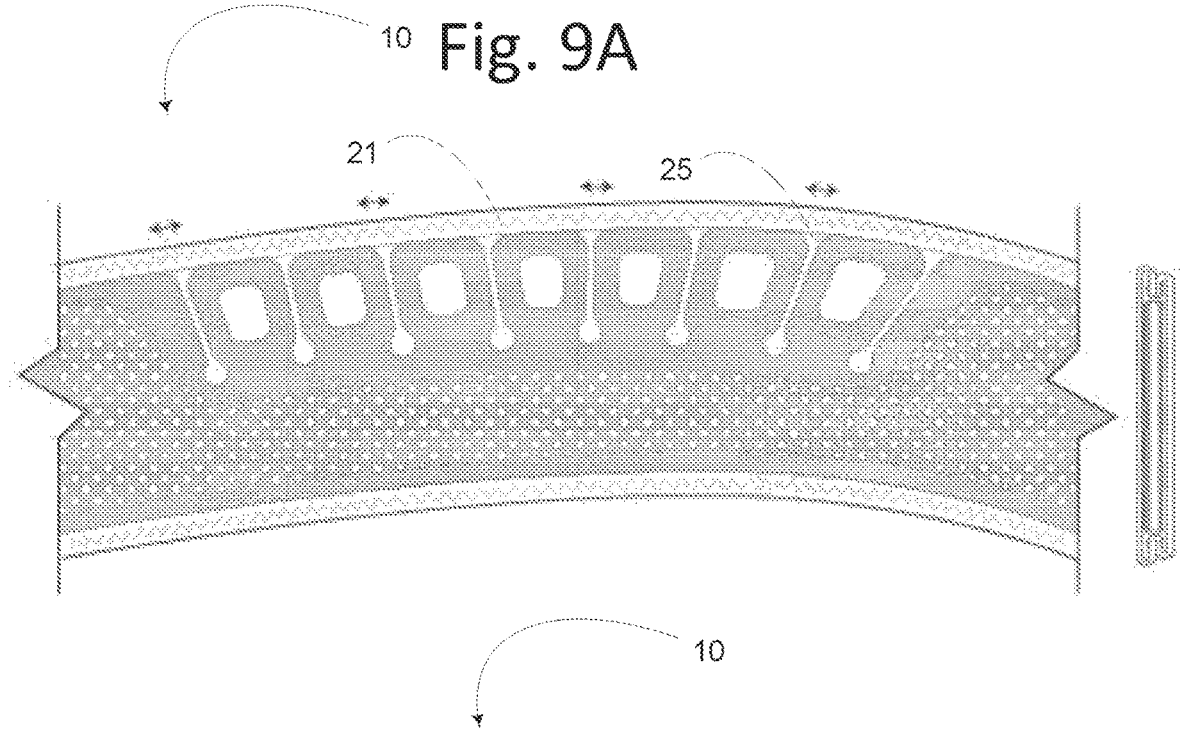
FIGS. 9A and 9B show the textile matrix in unflexed and flexed positions.
Figure 9B:
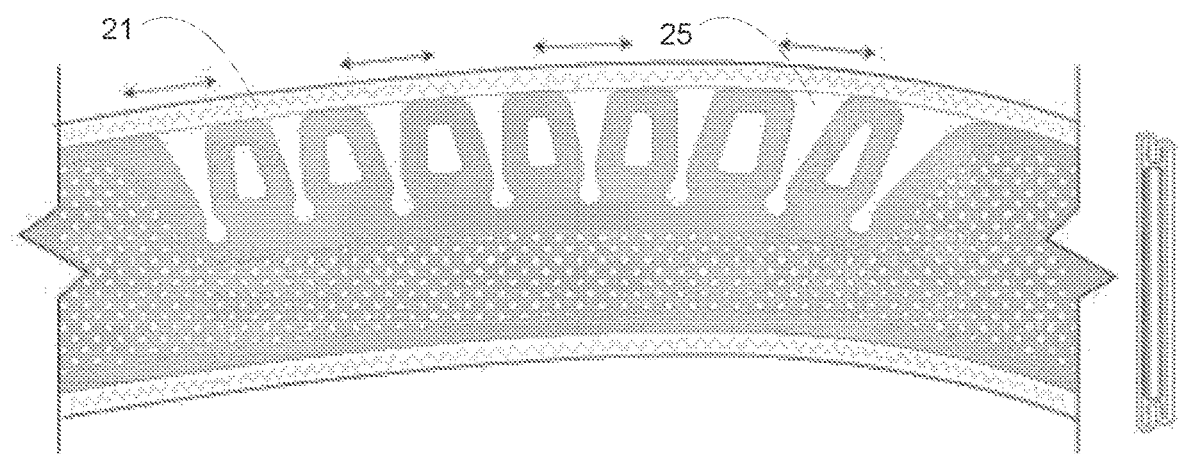

The contrast between FIGS. 9A (unflexed) and 9B (flexed) demonstrates the advantage of textile straps 10 of the inventive design. The geometry of straps is such as to resist flexure in any direction but by its narrowest dimension, i.e. bending onto itself. This is demonstrated by a conventional belt being readily wrapped around a waist of a wearer but resisting upward or downward flexure. Indeed, it is this characteristic of belts that makes them suitable for the carriage of holsters. The belt resists the downward pull of the holster thereby supporting the weight of the weapon the holster carries.

By cutting openings such as aperture 25 and/or gaps 25 in the textile matrix 19, the resulting textile strap 10 is less resistant to flexure. When flexed, the gaps 25 allow finger elements of the textile strap 10 to fan out thereby lowering, significantly, the stiffness along its length.

Figure 10A:
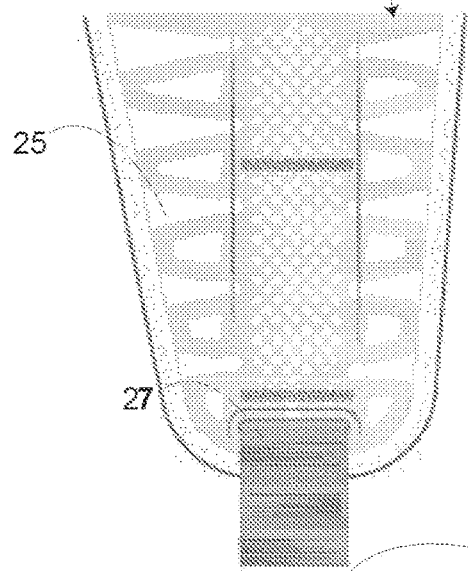
FIGS. 10A, 10B, 10C and 10D show alternative embodiments of tensioning members.
Figure 10B:
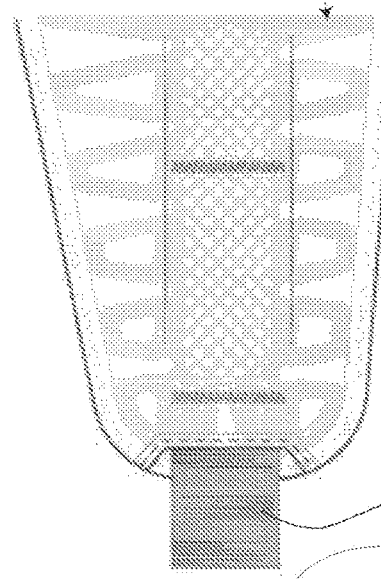
Figure 10C:
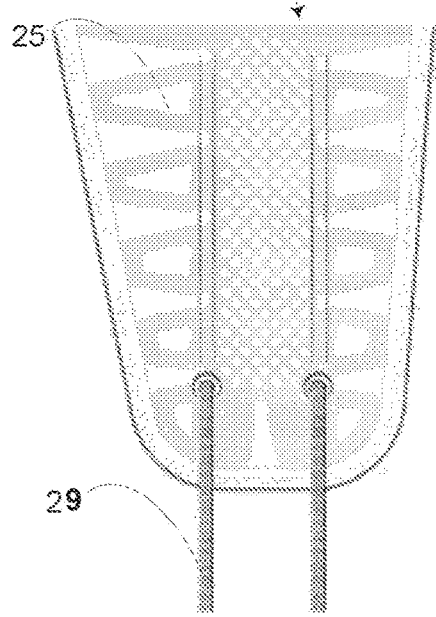
Figure 10D:
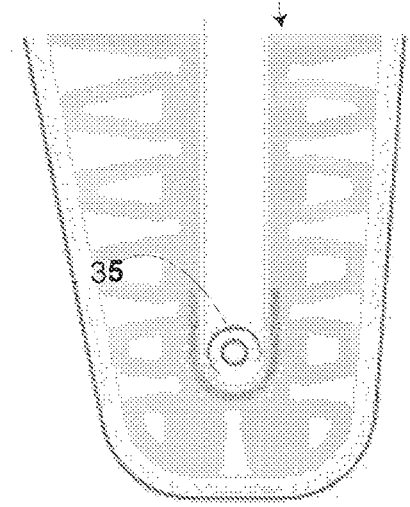

FIGS. 10A, 10B, 10C, and 10D show various embodiments wherein the textile matrix 19 is configured to include various tensioning arrangements. In FIG. 10A, interior strap 27 as shown in FIG. 4 is incorporated in the textile matrix 19 and allowed to slide within a channel (not shown) that encompasses the textile matrix 19. In this fashion the matrix 19 may slide as necessary to accommodate any supported load. Alternately, in FIG. 10B, interior strap 27 is fixed relative to the matrix 19 where fixation of the matrix relative to interior strap 27 is selected to be advantageous in the application. FIG. 10C depicts the cables 29 as depicted in FIG. 5 above, within the textile matrix 19 serving the same purpose as interior strap 27 shown in FIGS. 10A and 10B. Finally, in another embodiment shown in FIG. 10D, the cables 29 can include a rotary bobbin 35 that tensions the cables 29 within the matrix 19 without requiring external access to the cables 29.

In one particular embodiment of the inventive textile strap 10, the particular advantages discussed above are brought to bear in the context of a harness to secure a prothesis for a user. As shown in FIGS. 11A and 11B, a harness 30 for conventional prothesis might be formed of arcuate textile straps 33 and anchoring straps 31. Importantly these arcuate straps are configured to flex as discussed above relative to FIG. 6. As shown in FIG. 11D, apertures 23 and apertures 25 are cut in the textile matrix 19 to allow flexure of arcuate straps 33' as show in FIGS. 11A and 11B, which are flexed where the anchor straps 31 bear a prothesis (not shown). The forces f (indicated in FIG. 11C) suitably distort the arcuate textile straps 10 to flex in response to those forces.

The embodiments of the invention in which an exclusive property or privilege is claimed are defined as follows:

1. A method for forming a textile strap, the method comprising:
   forming a textile matrix by stacking in alternating order at least one first material layer on at least one second material layer;
   bonding the at least one first material layer to the at least one second material layer;
   forming a plurality of apertures through the textile matrix, the plurality of apertures being characterized by extending from an edge of the textile matrix inward such that the textile matrix is flexible in each of two directions and such that the textile matrix has a gradient of stretch across a zone of the textile matrix, wherein the zone is proximate to the edge of the textile matrix;
   sheathing the textile matrix within a stretch outer shell, wherein the stretch outer shell is configured to substantially enclose the textile matrix; and
   folding over and coupling folded over portions of opposite layers of the stretch outer shell together at a joint such that the stretch outer shell encompasses the textile matrix.

2. The method according to claim 1, wherein the bonding the at least one first material layer to the at least one second material layer comprises heat bonding.

3. The method according to claim 1, wherein the textile matrix comprises an electrospun membrane.

4. The method according to claim 1, wherein the forming the plurality of apertures is performed prior to the sheathing the textile matrix within the stretch outer shell, and wherein the plurality of apertures are configured to enhance flexibility of the textile matrix and maximize dispersion of weight across a surface area of the textile matrix.

5. The method according to claim 1, further comprising forming a plurality of perforations through the textile matrix, wherein the plurality of perforations are configured to enhance breathability of the textile matrix, and wherein the plurality of perforations are sized and spaced such that the plurality of perforations are configured to avoid substantially altering mechanical properties of the at least one second material layer.

\* \* \* \* \*